(12) United States Patent
Almeida

(10) Patent No.: US 6,767,163 B2
(45) Date of Patent: Jul. 27, 2004

(54) PLASMA PROCESS AND APPROPRIATE EQUIPMENT FOR THE REMOVAL OF HYDROCARBONS CONTAINED IN THE SLUDGE FROM PETROLEUM STORAGE TANKS AND/OR THE TREATMENT OF RESIDUES CONTAINING HYDROCARBONS

(75) Inventor: Fernando Carvalho Almeida, Granja Vianna II (BR)

(73) Assignee: TSL-Engenharia, Manutencao E. Preservacao Ambiental Ltda., Sao Paulo (BR)

( * ) Notice: Subject to any disclaimer, the term of this patent is extended or adjusted under 35 U.S.C. 154(b) by 0 days.

(21) Appl. No.: 10/130,179

(22) PCT Filed: Sep. 10, 2001

(86) PCT No.: PCT/BR01/00116
§ 371 (c)(1),
(2), (4) Date: May 10, 2002

(87) PCT Pub. No.: WO02/22215
PCT Pub. Date: Mar. 21, 2002

(65) Prior Publication Data
US 2002/0192030 A1 Dec. 19, 2002

(30) Foreign Application Priority Data
Sep. 13, 2000 (BR) .............................................. 0006651

(51) Int. Cl.$^7$ .............................. B09C 1/05; F23G 7/14

(52) U.S. Cl. .............................. 405/128.85; 405/128.8; 110/346; 110/342; 110/344

(58) Field of Search ................................ 588/210, 228, 588/230, 227, 212, 219, 222, 225, 237; 405/128.85

(56) References Cited

U.S. PATENT DOCUMENTS

| | | | | |
|---|---|---|---|---|
| 4,870,911 A | * | 10/1989 | Chang et al. | 110/246 |
| 4,886,001 A | * | 12/1989 | Chang et al. | 110/346 |
| 5,138,959 A | * | 8/1992 | Kulkarni | 110/346 |

(List continued on next page.)

OTHER PUBLICATIONS

Stone & Webster, Alternative Technologies and Approaches, "Transport of Secondary Wastes (carbon and DPE) Technology Screening" downloaded from www.pmcdtech.stoneweb.com/screening_techs.pdf, contract DAAM–01–96D—0010, May 1999, 80 pages.*

Primary Examiner—J. J. Swann
Assistant Examiner—Katherine Mitchell
(74) Attorney, Agent, or Firm—Bachman & LaPointe, P.C.

(57) ABSTRACT

A plasma process and equipment for eliminating toxic or hazardous organic compounds from different materials, particularly petroleum and oil contaminated soils. The process and equipment can also be used to remove the hydrocarbons contained in the sludge formed at the bottom of petroleum storage tanks. The process utilizes a plasma system for providing the necessary energy to the contaminated soil or sludge for the hydrocarbons to volatilize, keeping the temperature inside the reactor between 400 and 900° C. The volatilized compounds after leaving the reactor are collected in condensers, where the hydrocarbons can be recovered, in the form of a liquid hydrocarbon (oil). The contaminated material is continuously fed into the reactor from one end, while the clean material is removed from the other end of the reactor. The atmosphere inside the reactor is maintained neutral or reducing in order to prevent the oxidation of the hydrocarbons. Minimum amounts of off gases are generated in the process.

4 Claims, 3 Drawing Sheets

U.S. PATENT DOCUMENTS

| | | | | |
|---|---|---|---|---|
| 5,245,113 A | * | 9/1993 | Schulz | 588/209 |
| 5,451,738 A | * | 9/1995 | Alvi et al. | 219/121.59 |
| 5,490,907 A | * | 2/1996 | Weinwurm et al. | 203/29 |
| 5,663,476 A | * | 9/1997 | Cripe et al. | 588/228 |
| 5,788,735 A | * | 8/1998 | Bitler et al. | 75/10.19 |
| 5,798,497 A | * | 8/1998 | Titus et al. | 219/121.37 |
| 5,809,911 A | * | 9/1998 | Feizollahi | 110/346 |
| 5,866,752 A | * | 2/1999 | Goozner | 588/227 |
| 5,869,810 A | * | 2/1999 | Reynolds et al. | 219/388 |
| 6,152,050 A | * | 11/2000 | Tsantrizos et al. | 110/185 |

* cited by examiner

PLASMA PROCESS AND APPROPRIATE EQUIPMENT FOR THE REMOVAL OF HYDROCARBONS CONTAINED IN THE SLUDGE FROM PETROLEUM STORAGE TANKS AND/OR THE TREATMENT OF RESIDUES CONTAINING HYDROCARBONS

BACKGROUND OF THE INVENTION a) Field of the Invention

The present invention relates to a plasma process and appropriate equipment well adapted for the removal of hydrocarbons contained in the sludge formed at the bottom of petroleum storage tanks, which contains crude oil and a significant amount of inorganic solid material and water. The process is applicable for the treatment of contaminated soil and sludges, eliminating toxic or hazardous organic compounds, such as petroleum oils, pesticides, herbicides and various hydrocarbons resulting from spills or inappropriate disposal/handling of these materials.

b) Brief Description of the Prior Art

Soils contaminated with petroleum or other types of oils are normally the result of accidental spills or during maintenance of pipelines, and are commonly found in, or close to, petrochemical and refinery plants. It is common to find soil contaminated with more than 25% in weight of petroleum or oil. Such petroleum or oils present serious threat to the environment, endangering vegetal and animal species, including human beings. In the same category can be included soils, sludges and similar materials contaminated with other organic compounds, such as pesticides and herbicides, in which case contamination could vary from tens of ppm (parts per million) to a significant percentage. In all contamination cases mentioned above there are considerable risks to the environment so that toxic or hazardous organic compounds must be removed from the soil or sludge and properly treated.

Another source of hydrocarbons is the sludge formed in petroleum storage tanks; which contains significant amounts of inorganic solid material, as well as water, and must be properly treated before it can be returned to a natural environment. For simplicity, the different types of organic compounds mentioned above, soil contaminants and those present in different types of sludges will be referred to in this document as hydrocarbons.

There are several treatments processes for the above mentioned contaminated materials. The most commonly used include incineration and the use of centrifuges. However, as will be shown, both methods have serious limitations that the present invention offers a superior and feasible alternative.

Incineration is a common practice in engineering (see for instance Chemical Engineering Handbook, ed. R. H. Perry e C. H. Chilton, McGraw-Hill Book Company, $5^{th}$ Edition, 1973, pg. 9–35 a 9–36). In particular, for the treatment of hydrocarbon contaminated materials. The contaminated material is fed into a rotary furnace having an adequate refractory lining. Gas or oil burners are used to maintain the furnace temperature within a range of 500 to 1,000° C.; air must be present in the furnace, and at this temperature the oxygen from the air causes a partial or complete combustion of the hydrocarbons. The presence of water contained in the contaminated material volatilises and leaves the furnace with the combustion gases. The residue of the process is a material that, in principle, should be free of organic toxic or hazardous compounds, but the problems associated with incineration processes are: a) large volume of effluent gases requiring treatment, (the effluent gases are the sum of: the entrained air for the process, the gases resulting from the combustion of the organic toxic compounds, the gases from the burners and water vapour); b) poor energy efficiency, since a most of the heat from the oil/gas burners leaves the furnace with the exhaust gases; typical energy efficiencies are less than 20% for the overall process; c) no recovery of the initial organic materials is possible, since the hydrocarbons are burnt, which represents a significant loss.

The use of centrifuges to separate liquid from solids is a common engineering practice (see for instance Chemical Engineering Handbook, ed. R. H. Perry e C. H. Chilton, McGraw-Hill Book Company, $5^{th}$ Edition, 1973, pg. 19–87 a 19–98). Centrifuges are used to treat hydrocarbon contaminated soil or sludges (see for instance U.S. Pat. No. 6,149,345-A, P E Atkins, "Remediation of hydrocarbon-contaminated soil or groundwater by apparatus having a centrifugal separator, a vacuum source, a vent, a fractionator (FS) and a fill sensor, where the separated liquid is fed to the FS via a low-shear pump"). In this application the contaminated material, containing variable amounts of hydrocarbons and water, is fed into a rotating vessel, called a centrifuge, in which centrifugal forces separate liquid hydrocarbons and any water from contaminating soil or solids contained in the sludges. The result of the process should, ideally, leave soil or sludge free of hydrocarbons and water, and the recovery of such organic liquids. The problem associated with centrifuges is the impossibility of complete removal of hydrocarbons; the soil or sludge after the treatment still contains typically more than 5% (by weight) of organic contaminants.

The use of thermal plasmas is a recognised method for the disposal of hospital wastes, industrial residues and reclaiming aluminium from foundry waste (dross) and such like. In this connection, reference can be made to the article of R. N. Szente (ASP Conference Proc., n.345, pg. 487, 1995). Thermal plasmas are obtained using an electric arc to heat a common gas to temperatures of the order of 20,000° C. The equipment that generates the thermal plasma is the plasma torch, that can have different geometries, such as tubular metallic electrodes or alternatively graphite electrodes in either case an electric arc is maintained between the electrodes to heat the gases. At these temperatures gases are partially ionised, and are called plasmas, which have different properties from those of the outlet gases and can be employed when high temperatures are needed in a process or when ionised types are necessary for certain chemical reactions or physical modifications of materials. The usual method of generating thermal plasmas is from a direct current power supply, as opposed to the alternating current employed in metallurgical arc furnaces. A given residue will require a specific type of plasma system and reactor. Plasma processes for residues usually need a process temperature of about 1,500° C., in order to melt the inorganic compounds contained in the residues and also to oxidize the organic compounds, generating carbon monoxide or carbon dioxide and water vapour.

With particular reference to the subject invention the following work regarding thermal plasma treatment of aluminium dross should be mentioned: G. Dube, J. P. Huni, W. Stevens, S. Lavoie, "Recovery of Non-Ferrous Metals from Dross Using the Plasma Dross Process", U.S. Pat. No. 4,960,460, Oct. 2, 1990, since this process has some similarities in its operating conditions and heat transfer mechanisms to that of the present invention. For treating aluminium dross, the material is fed into a rotating reactor, the door of which is then closed. Inside the reactor, a plasma torch or, alternatively, graphite electrodes with a direct current electric arc striking between them, is used to keep a controlled atmosphere and at the same time, to provide the necessary energy for the process. The plasma torch or graphite electrodes are normally located in the central region of the reactor. The process consists basically in melting out aluminium from the dross at approximately 700° C. in a non-oxidising atmosphere in order to avoid the oxidation of the recovered metal. No water should exist with the aluminium dross since it could cause oxidization or even cause an explosion, owing to a reduction of water to hydrogen in the molten aluminium. The process is conducted in a batch form. Once the aluminium contained in the dross has melted the reactor is opened and the liquid metal is poured into molds. Other compounds, principally aluminium oxide, are removed from the reactor and another charge is loaded. The process is well adapted for treating aluminium dross, but has not been used for other types of residues since it is essentially a batch process, has no provision for effluent gases and very few materials would melt at 700° C. for the desired separation,

OBJECT AND SUMMARY OF THE INVENTION

The object of the present invention is to provide a process and the appropriate equipment for the treatment of soil and/or sludges contaminated with toxic or hazardous compounds, such as different hydrocarbons, petroleum, oils and/or pesticides and herbicides and similar organic compounds, and alternatively for the removal of hydrocarbons contained in the sludge formed at the bottom of petroleum storage tanks; the proposed process and appropriate equipment overcomes the problems of processes hitherto used in industry.

More particularly, the object of the invention is to provide a plasma process and appropriate equipment for the treatment of soil and/or sludges contaminated with hydrocarbons, which, owing to its technical characteristics offers the following advantages over other processes, known to the Applicant, for the treatment of similar materials:

a) removal of the contaminants to less than 0.1% in weight of the soil or sludge;

b) continuous operation process, c) possibility of reclaiming the contaminants when desired;

d) high energy efficiency of the process; and e) small or insignificant amount of gases to be treated.

A detailed description of the plasma process and the appropriate equipment and its advantages over other processes is given below.

The plasma process developed by the inventor utilizes a plasma system for providing enough energy to the contaminated soil or sludge for the hydrocarbons to volatilise. The normal operating temperature of the proposed plasma process is between 400 and 900° C., in order to volatilise all the hydrocarbons contained in the treated material. The volatilised compounds after leaving the plasma reactor are collected in condensers, where the hydrocarbons can be recovered, in a form of a liquid hydrocarbon (oil), when dealing with petroleum or oil contaminated soils/sludges. Any water contained in the contaminated material is also volatilised in the process and collected in the condenser. The contaminated soil or sludge is continuously fed into the reactor from one end, while the oil free soil or residue is removed from the other end of the reactor. The atmosphere inside the plasma reactor is maintained neutral or reducing in order to prevent the oxidation of the hydrocarbons and to permit their recovery after volatilising them inside the reactor and condensing the hydrocarbons outside the plasma reactor.

The main advantages of using the plasma system for treating the above mentioned residues, as compared to a normal incineration process, are: a) higher energy efficiency, since the plasma jet is at much higher temperature-than the flame produced by oil or gas burners employed in incineration (typically 15,000° C. for the plasma jet and 2,000° C. for the oil or gas flame), so that the heat transfer, dependent on the temperatures of the energy source and the heated substance, is significantly higher in the plasma process, increasing substantially the energy efficiency of the plasma process. A typical energy efficiency above 80%, is achieved with the plasma process as compared to around 20% of normal gas or oil burners); b) possibility of recovering the hydrocarbon contaminants which can be a significant asset for the process specially when the soil or sludge contain more than 10% in weight of hydrocarbons; c) significantly lower effluent gas volume to be treated, since the plasma torch can operate with small amounts of gas when compared to the volume of gases produced in the combustion of oil or gas in burners; also the effluent gases of the plasma process, composed of volatised organic compounds, can be easily condensed and result in negligible quantities of exhaust gases. The main advantage of using the plasma system for treating the above-mentioned residues, when comparing to the centrifuge process, is the capacity for total elimination of the contaminants from soil and sludge, which compares favourably with the 5% (by weight) of hydrocarbons remaining after a centrifuge process.

The proposed process with its ancillary equipment has the following differences and advantages for treating contaminated soil or sludge when comparing with the existing plasma process used for treating aluminium dross: a) the proposed process with the appropriate equipment provides a continuous feeding of contaminated material and removal of clean material, which is not achievable with the aluminium dross process; b) in the proposed process the contaminants are volatilised and leave the reactor continuously in a gaseous form, whereas the aluminium dross plasma process, the materials stay inside the reactor until the end of the batch cycle; c) in the proposed process the gases on leaving the reactor are condensed in order to reclaim the hydrocarbons from the contaminated substances; d) in the aluminium dross plasma process small amounts of gases are produced; which are not normally removed during the process from inside the reactor neither are they subsequently treated.

A descriptive outline of the equipment used for the process described above for treating soil or sludge contaminated with hydrocarbon compounds using thermal plasma will is herein described with reference to the accompanying drawings, in which:

FIG. 1 is a block diagram of the main steps of the process, comprising the following parts:

A—Continuous feeding of residues in a static (non rotating) reactor;

B—Heating of the residues using a plasma system to temperatures between 400 and 900° C., in non-oxidising atmosphere;

C—Volatilisation of the hydrocarbons and eventual water initially present in the residues and continuous removal of the resulting gases;

D—Condensation of the effluent vapours in a vessel (condenser) located outside the reactor or alternatively, the burning of the vapours to generate energy;

E—Removal of the solid material free of hydrocarbons.

Figure 1:
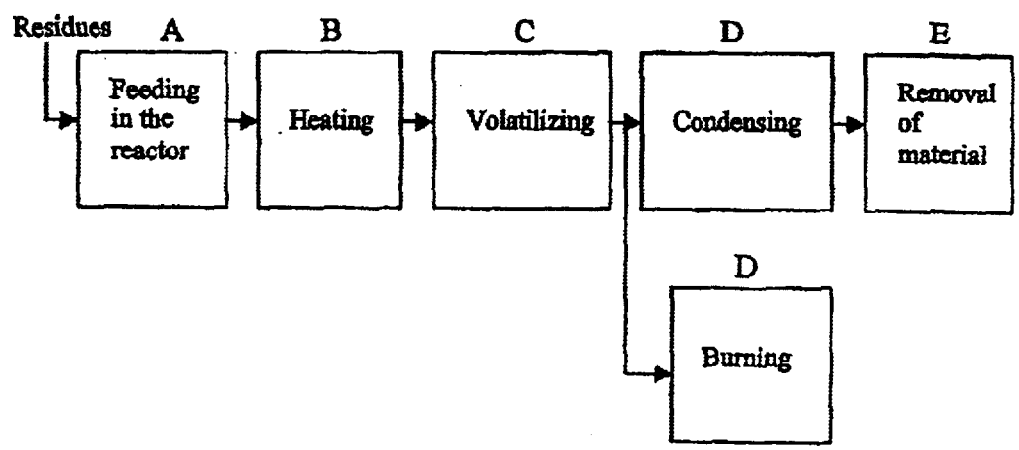
Figure 2:
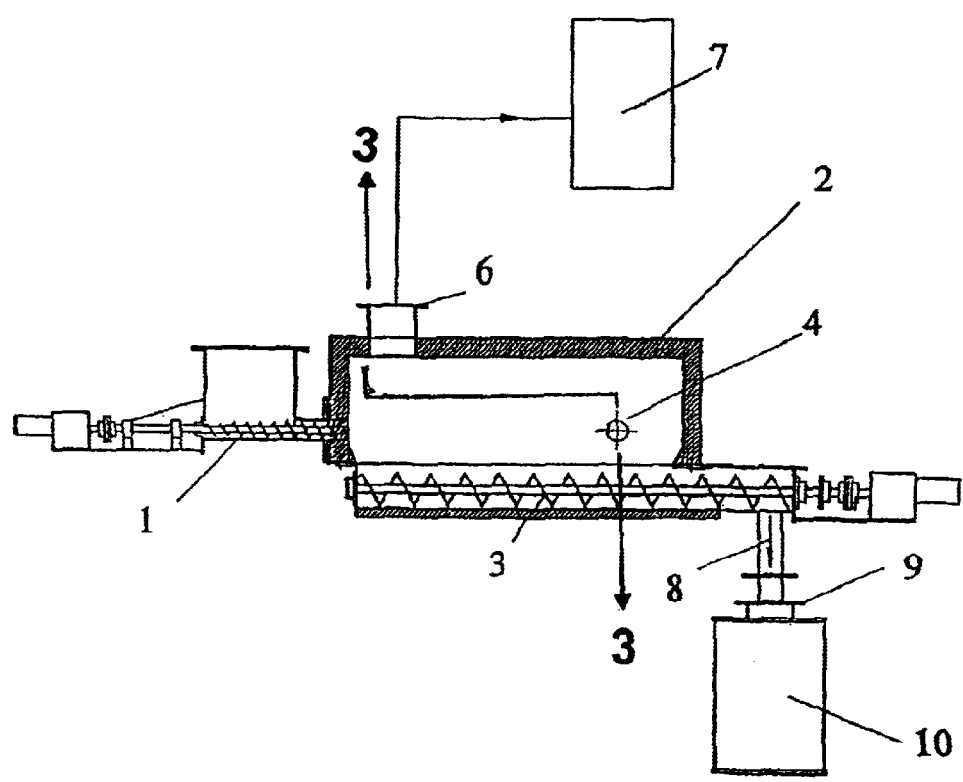
FIG. 2 is a side view representation of the equipment suggested for performing the developed process.
Figure 3:
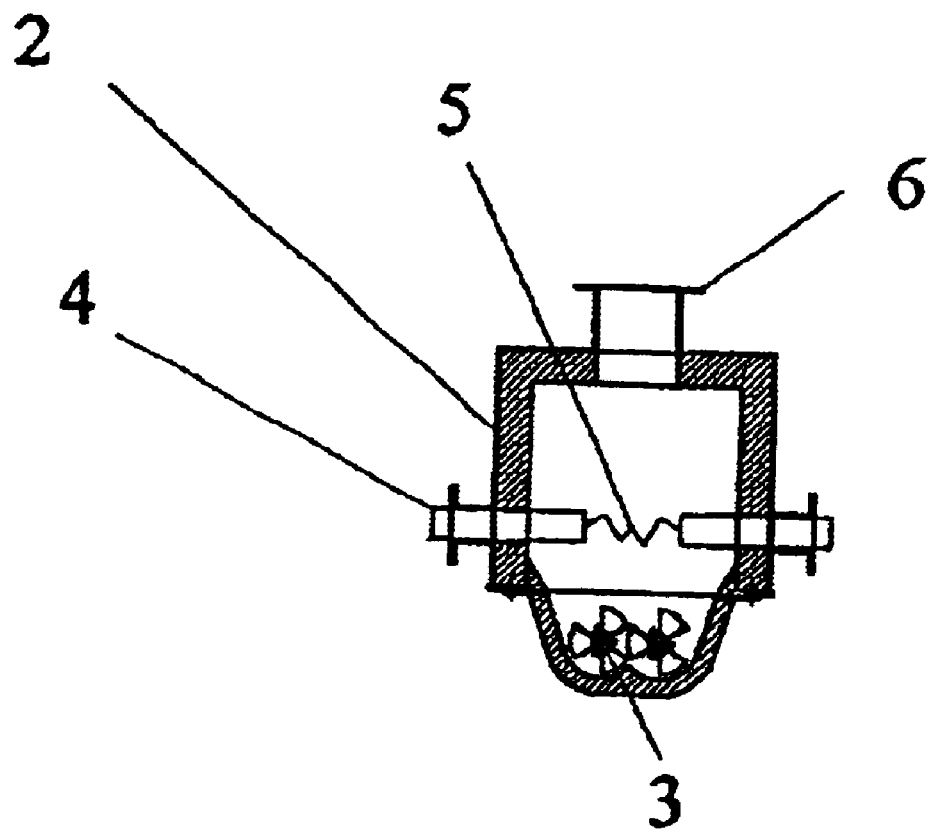
FIG. 3 is a sectional view representation of the equipment described in FIG. 2. In the figures the reference numerals have been used for identifying the different equipment.

The equipment comprises a feeding system 1, a static (non rotating) reactor 2, an internal mechanism, such as a rotating screw 3, for transporting the residues inside the reactor; a plasma system 4 comprised of graphite electrodes that maintain a direct current electric arc 5. At the same end of the feeding system there is a tube 6 or other means for the removal of volatilised compounds. The volatilised compounds go through a condenser 7, located outside the plasma reactor. A common fan or blower is used for removing the effluent gases from the reactor and passing them in the condenser. The material clean of hydrocarbons, is removed by gravity through the exit 8; gate valves 9 or similar equipment prevents the entrance of air into the reactor and the clean material is collected in the silo 10.

The process can be understood, according to these diagrams, as follows: the material containing hydrocarbons is fed into the plasma reactor, where it is heated to temperatures of the order of 700° C., resulting in the volatilisation of hydrocarbons and eventual water present in the residues. When treating soil or sludge contaminated with petroleum, oil or similar hydrocarbons the outlet gases pass through a condenser for recovery of valuable hydrocarbons. The contaminated material as it travel through the reactor, becomes increasingly free of organic contaminants; and it quite clean once it has reached the outlet chute for removal from the reactor.

The equipment proposed for treating organic contaminated soils/sludges has several basic differences with respect to the above mention equipment used for treating aluminium dross, among which it is of particular interest to point out: a) the proposed equipment is a static vessel containing a moving carrying device for transporting the material inside the reactor, whereas the equipment used for treating aluminium dross consists of a rotating vessel with no movable parts inside the reactor; b) the proposed equipment contains a continuous feed device for contaminated material and another for continuously remove the clean materials, by contrast the aluminium dross equipment is a batch process; c) the proposed equipment contains an exhaust pipe for effluent gases and condensers and/or a gas cleaning system; the equipment used for treating aluminium dross has no means of removing and treating gases during the operation.

Clearly it would be possible to modify numerous details of the subject invention while keeping within the stated, scope, methods and objectives of the present claim. For example, it has been disclosed herein that the transportation system comprises a rotating screw, but this is just one of the possible operating features. Alternatives include a vibrating conveyor. Similarly it has been disclosed that the appropriate equipment for conducting the process contains a plasma system at one end of the fixed vessel; in the case of a long reactor, but it would be possible to install more than one plasma torch or pair of graphite electrodes for providing the necessary process energy.

A prototype of the proposed equipment was built to develop the proposed process. Contaminated soils, containing from 5 to 90% in weight of petroleum or oil were fed into a plasma reactor similar to the one described above. The temperature inside the plasma reactor was maintained at approximately 700° C. using a direct current electric arc striking between graphite electrodes placed at one end of the reactor; the contaminated material was fed into the opposite end of the reactor as described above. The cleaned material was removed from the reactor and the effluent gases went through a condenser and released to the atmosphere. The material was analysed before and after going through the process. The results of the analysis, by an independent analytical laboratory (Laboratorio Bauer-Abbo S/c Ltda, R. Aquininos 111, São Paulo, S. P., Brazil, email: bauer@falcaobauer.com.br), revealed that, regardless of the initial composition or content of organic contaminants in the soil, the cleaned material after the plasma process contained less than 0.05% of organic compounds, being considered free of contaminants. The hydrocarbons were recovered in the tests in a condenser outside the reactor and could be reused for different applications.

I claim:

1. An improved process for the treatment of a hydrocarbon containing material comprising the following combination of steps:

(a) continuously feeding a hydrocarbon containing material to one end of a static reactor and transporting the hydrocarbon containing material to an other end of the static reactor;

(b) locating a plasma system for heating the hydrocarbon containing material in the static reactor at the other end of the static reactor wherein the hydrocarbon containing material is heated to a process temperature of between 400 and 900° C. and maintained at the process temperature to volatize the hydrocarbon contaminants and produce effluent gases;

(c) controlling the atmosphere inside the static reactor during volatization to provide one of a reducing and neutral atmosphere to recover valuable raw materials from the hydrocarbon contaminated material;

(d) providing at the one end of the static reactor means for removing effluent gases from the static reactor resulting from the volatization of the hydrocarbon contaminants; and (e) continuously removing the recovered raw materials from the other end of the static reactor.

2. A process according to claim 1 wherein the removed effluent gases are burnt in a separate vessel outside of the static reactor.

3. A method according to claim 1, wherein the plasma system comprises graphite electrodes and an electric arc s maintained between the graphite electrodes.

4. A method according to claim 1, wherein the plasma system includes a plurality of plasma torches located within the static reactor wherein the plurality of plasma torches are located at the other end of the static reactor.

* * * * *